United States Patent [19]

Bischops

[11] Patent Number: 4,735,755

[45] Date of Patent: Apr. 5, 1988

[54] METHOD FOR THE PREPARATION OF A SETTING FOAM MATERIAL CONTAINING PLASTIC-MATERIAL GRANULES

[75] Inventor: Adrianus T. M. Bischops, Leiderdorp, Netherlands

[73] Assignee: Vorbij's Beton B.V., Wilnis, Netherlands

[21] Appl. No.: 832,773

[22] Filed: Feb. 25, 1986

[30] Foreign Application Priority Data

Feb. 25, 1985 [NL] Netherlands .......................... 8500532

[51] Int. Cl.$^4$ ............................ B28B 1/50; B28C 5/00
[52] U.S. Cl. .................................. 264/42; 264/DIG. 7
[58] Field of Search ............................ 264/DIG. 7, 42

[56] References Cited

U.S. PATENT DOCUMENTS

| | | | |
|---|---|---|---|
| 3,251,916 | 5/1966 | Newnham et al. | 264/DIG. 7 |
| 3,912,838 | 10/1975 | Kraus | 427/426 |
| 3,914,359 | 10/1975 | Bevan | 264/DIG. 7 |
| 4,100,242 | 7/1978 | Leach | 264/DIG. 7 |
| 4,265,964 | 5/1981 | Burkhart | 428/306 |

FOREIGN PATENT DOCUMENTS

| | | |
|---|---|---|
| 2032556 | 2/1972 | Fed. Rep. of Germany . |
| 2238829 | 2/1975 | France . |
| 2391051 | 12/1978 | France . |
| 6506306 | 11/1965 | Netherlands . |
| 7017757 | 6/1971 | Netherlands . |
| 1300457 | 12/1972 | United Kingdom . |
| 1596200 | 9/1981 | United Kingdom . |
| 2086748 | 5/1982 | United Kingdom . |

Primary Examiner—Philip Anderson
Attorney, Agent, or Firm—Carl G. Love

[57] ABSTRACT

Method for preparing a setting foam material containing plastic material granules, which plastic material granules are prepared from beads of plastic material. After preparing a slurry of base material it is mixed with the plastic material granules. This motar is immediately pumped after which the foam is introduced.

5 Claims, 2 Drawing Sheets

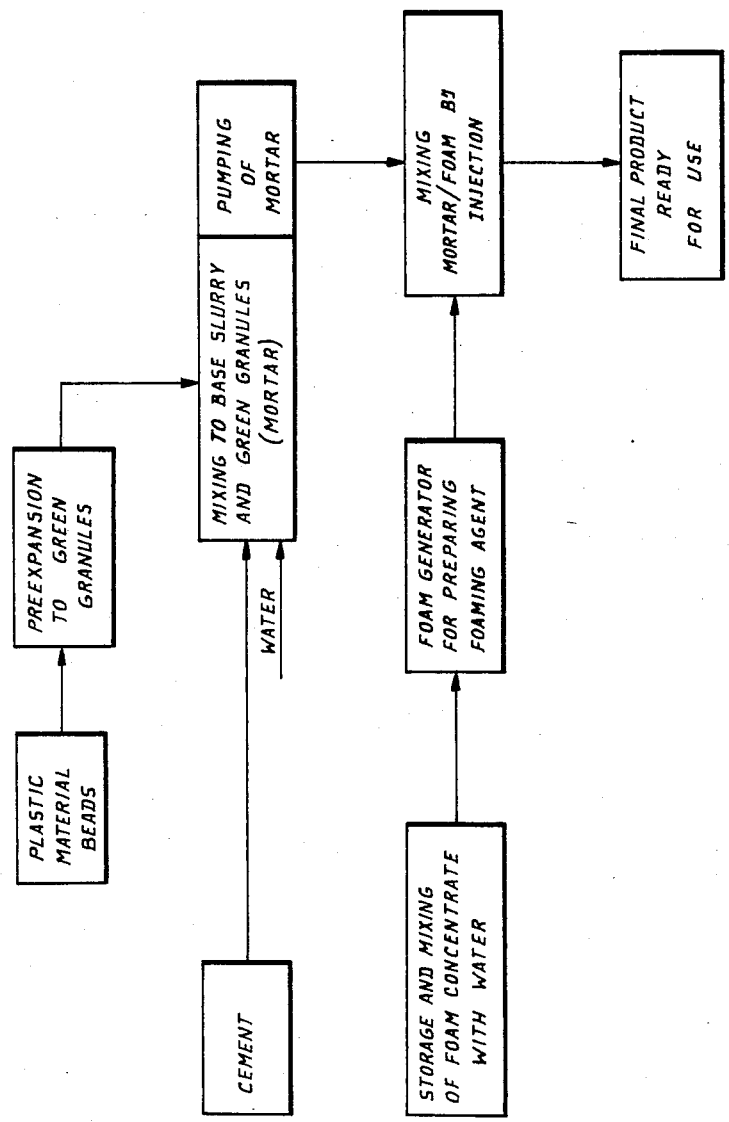

METHOD FOR THE PREPARATION OF A SETTING FOAM MATERIAL CONTAINING PLASTIC-MATERIAL GRANULES

The present invention relate to a method for the preparation of a setting foam material containing plastic-material granules, which plastic-material granules are prepared from beads of plastic material, comprising the preparation of a slurry of base material, a foam being introduced into the slurry of base material.

A method of this type is known in the prior art and comprises the mixing of cement and water into a slurry of base material during the preparation of concrete, followed by adding thereto plastic-material granules and foam, thereafter the material is pumped to the place of use. These plastic-material granules are produced beforehand by the pre-expansion of beads of plastic material. Before adding the then green granules to the slurry, they are first aged for at least 24 hours. The mass consisting of slurry, plastic-material granules and foam consists largely of small foam bubbles. With this method in which air is pumped there is associated the disadvantage that for pumping the final product (the mixture of slurry, plastic-material granules and foam) large pumps are needed, a considerable part of the capacity of which is necessary for pumping the foam formed. The necessity of having to foam fully expanded after the introduction of the plastic-material granules is due to the fact that the plastic-material granules will otherwise float up, as a result of which separation occurs. As a result of introducing the foam, small foam bubbles which prevent the plastic-material granules floating up are produced around the periphery of the granules.

It is the object of the invention to avoid this disadvantage. This object is achieved in the method described above in that after the mixing of the slurry of base material and the plastic-material granules to form a mortar, the latter is immediately pumped, after which the foam is introduced.

As a result of pumping the mortar thus produced immediately after adding the plastic-material granules to the slurry of base material floating up of the plastic materials is avoided. As long as the mixture is in motion, this will not occur and the foam can be introduced after the pumping. This means that the foam does not have to be pumped with the result that the capacity of the pumps used can be reduced to a considerable extent.

According to a further embodiment which is of advantage, the plastic-material granules are added to the slurry of base material essentially immediately after the pre-expansion of the beads of plastic material to form (green) plastic-material granules.

Surprisingly it has turned out that a contrast to what was believed until now, it is not necessary to allow the plastic-material granules to age for 24 hours before it is possible to add them to the slurry of base material. This means that the storage of the plastic-material granules, which takes up considerable space, can be omitted. In spite of the use of green granules, these do not appear to collapse. These granules can then set further in the mortar.

According to a further development thereof, a material which absorbs water during setting is used for the base material and the plastic-material granules give off water during setting. As a result of the fact that, in contrast to the usual methods, the plastic-material granules set in the slurry of base material, use may be made of the physical phenomenon that some base materials absorb water during setting while the plastic-material granules give off water during setting so that less water has to be added or removed. This provides a simplification of the process control and also an additional cost saving.

In particular, a cement-containing material can be used as the base material. As the cement hardens, it absorbs water and heat is produced. As the plastic-material granules set, water is given off and heat is absorbed. As a result of the combination of the materials the reaction mechanisms supplement each other.

Preferably polystyrene particles are used as the plastic-material particles, as a result of which particular mechanical properties are imparted to the concrete.

The invention will be described in detail below on the basis of a method to which preference is given, reference being made to the single FIGURE in which a block diagram of the method is incorporated.

In the FIGURE the method for the manufacture of the foam concrete is depicted. To prepare this foam concrete, a slurry of base material is first produced which in this case consists of cement and water. To this slurry of base material green granules are added. This addition may also take place during the mixing of the slurry of base material.

The said green granule is obtained by pre-expansion, for example by means of steam injection. The mixture consisting of green granules and base slurry has a much smaller volume than the mixture prepared by the usual methods and consisting of base slurry, plastic-material granules and foam. As a result, for the pumping of the mortar use can be made of pipes and pumps with a considerably lower capacity than are used according to the prior art. As a result of pumping the green granules immediately after mixing, there is no risk of separation. Even the use of rotary and peristaltic pumps does not result in this process in damage to the green granules which have to set further. At some point after the pump and before the place of application foam is added to the mortar. This foam may be a mixture of water and known foam concentrate which is produced under pressure with a foam generator and introduced into the transportation pipe by injection. In this step the volume of the mortar increases to a considerable extent, but this happens after the pump so that no disadvantages are associated with it. If polystyrene is used as the plastic material and if the base material is a hydrating material, the reaction mechanisms of the setting appear to complement each other. That is to say, during the setting of, for example, cement or plaster, water is absorbed and heat is liberated, and during setting of the polystyrene granules, heat is absorbed and water is liberated. The ultimate properties of the final product can be determined by the use of various materials and various quantity ratios. It appears that the mixture of slurry of base material and beads of plastic-material has a very good plasticity for processing. In spite of the introduction of the foam only at the last moment, no separation of the final product occurs. In addition, it is possible to introduce the foam immediately after the pump. In this case it is true that larger pipes are necessary, but, on the otherhand, the advantage emerges that the foam generator can be combined with the pump unit and the mixing system for the slurry of base material and the green granules. The mixture which is produced after injection of foam has a plasticity such that pumping over distance of 300 meters and over is possible while after small foam bubbles have been produced, no separation takes place during intermediate storage.

EXAMPLE

In the method according to the prior art, for the preparation of 500 m³ of foam concrete containing polystyrene granules a storage capacity of 350 m³ is necessary for polystyrene granules which have to age in it for at least 24 hours in order to acquire the necessary strength.

In the method according to the invention, these 500 m³ are obtained by using 150 tons of cement mixed with 60 m³ of water and 8.75 m³ of polystyrene bead pre-expanded to form 350 m³ of loose polystyrene granules, approximately 200 liters of foam being added after pumping.

Although the invention is described above on the basis of the use of foam concrete with polystyrene granules it must be understood that the invention is not limited thereto and that any other material such as, for example plaster, can be used for the setting material, while any other material resulting in plastic-material granules can be used instead of polystyrene material.

The foam can also comprise all the composition known in the prior art.

What is claimed is:

1. A method for preparing a setting foam material containing plastic granules comprising, preparing a slurry of base material; adding plastic granules to said slurry forming a mortar, wherein said plastic granules are prepared by pre-expanding plastic beads; pumping said mortar to the place of use; introducing foam into said mortar, and permitting said mortar to set.

2. The method of claim 1, wherein the plastic granules are added to the slurry essentially immediately after their preparation from pre-expanding the plastic beads.

3. The method of claim 2, wherein the base material comprises a material capable of absorbing water and the plastic granules comprise a material capable of giving off water during the setting of said mortar.

4. The method of claim 3, wherein said base material contains cement.

5. The method of claim 1, wherein said plastic granules are comprised of polystyrene.

* * * * *